118,212

UNITED STATES PATENT OFFICE.

HENRY DEACON, OF WIDNES, ENGLAND.

IMPROVEMENT IN TREATING MIXED GASES CONTAINING CHLORINE FOR THE PRODUCTION OF BLEACHING-POWDERS, &c.

Specification forming part of Letters Patent No. 118,212, dated August 22, 1871.

*To all whom it may concern:*

Be it known that I, HENRY DEACON, of Appleton House, Widnes, in the county of Lancaster, England, alkali manufacturer, have invented Improvements in the Treatment of Mixed Gases Containing Chlorine for the Production of Bleaching-Powder, of which the following is a specification:

This invention consists in drying the gases containing the chlorine after they have been purified by washing with water and then bringing these dry gases in contact with lime, in order to convert it into bleaching-powder or to render it suitable for other purposes.

I do this by passing the mixed gases over dry chloride of calcium or over surfaces of coke or other porous material moistened with strong vitriol. The chloride of calcium or the impregnated coke in lumps or in small pieces, or the other impregnated porous substances, are contained in stone towers, and rest on arches of brick-work, the gases passing through the interstices. The coke or other porous substances are kept moistened by vitriol from the top and are withdrawn from the bottom. The moisture or aqueous vapor contained in the gases is withdrawn or absorbed by the means of the chloride of calcium or by the vitriol. When chloride of calcium is employed the water absorbed from the mixed gases causes the chloride of calcium to dissolve, and the solution may be withdrawn at the bottom of the apparatus.

It is well understood that the vitriol and the chloride of calcium are alternatives and are not to be used together. The solution of chloride of calcium and the weakened vitrol thus resulting may be separately concentrated and used again and again. The dry gases may then be allowed to pass onward to the chambers or to other apparatus containing the lime which it is intended should absorb the chlorine and form the bleaching-powder, or the dry gases may be otherwise employed.

I claim—

The drying of the mixed gases, produced as herein described, when employed for the manufacture of bleaching-powder, or otherwise, by means of chloride of calcium or by means of sulphuric acid, substantially as hereinbefore described.

In testimony whereof I have signed my name to this specification in the presence of two subscribing witnesses.

HENRY DEACON.

Witnesses:
ALEXANDER WALKER,
JOHN HOWARD.